US006416815B2

(12) United States Patent
Greinke et al.

(10) Patent No.: US 6,416,815 B2
(45) Date of Patent: Jul. 9, 2002

(54) EXPANDABLE GRAPHITE AND METHOD

(75) Inventors: Ronald Alfred Greinke, Medina; Robert Anderson Reyolds, III, Bay Village, both of OH (US)

(73) Assignee: Graftech Inc., Lakewood, OH (US)

(*) Notice: Subject to any disclaimer, the term of this patent is extended or adjusted under 35 U.S.C. 154(b) by 0 days.

(21) Appl. No.: 09/817,002

(22) Filed: Mar. 23, 2001

Related U.S. Application Data

(63) Continuation-in-part of application No. 09/666,096, filed on Sep. 21, 2000, now abandoned, which is a continuation-in-part of application No. 09/633,184, filed on Aug. 4, 2000, now abandoned, which is a continuation-in-part of application No. 09/015,590, filed on Jan. 29, 1998, now Pat. No. 6,149,972.

(51) Int. Cl.$^7$ .............................. B05D 7/00; B05D 3/04; B05D 5/00

(52) U.S. Cl. ...................... 427/220; 427/212; 427/215; 427/333; 427/301; 427/399

(58) Field of Search ................................ 427/220, 212, 427/215, 333, 301, 399

(56) References Cited

U.S. PATENT DOCUMENTS

| | | | |
|---|---|---|---|
| 3,404,061 A | 10/1968 | Shane et al. ................. | 161/125 |
| 4,350,576 A | 9/1982 | Watanabe et al. ............ | 204/101 |
| 4,895,713 A | 1/1990 | Greinke et al. .............. | 423/448 |
| 5,149,518 A | 9/1992 | Mercuri et al. .............. | 423/449 |
| 5,173,515 A | * 12/1992 | von Bonin et al. .......... | 521/103 |
| 5,376,450 A | * 12/1994 | Greinke et al. .............. | 428/402 |
| 5,503,717 A | 4/1996 | Kang et al. .................. | 205/478 |
| 5,582,811 A | 12/1996 | Greinke et al. .............. | 423/265 |
| 5,698,088 A | 12/1997 | Kang et al. .................. | 205/555 |

FOREIGN PATENT DOCUMENTS

| EP | 0596801 | 5/1994 | ........... C01B/31/00 |

OTHER PUBLICATIONS

Materials Research Bulletin 35, 2000, pp. 425–430; "On Lower–Nitrogen Expandable Graphite", by Song, Kemin, Dun Huijuan.
1999 Joint International Meeting, Honolulu, Hawaii, 10/17–22/99, Meeting Abstracts, Battery Div., "Study of the Lithium Intercalation Process in Mechanically Milled Graphite", Ong & Yang.
International Symposium of Carbon, 1998 (Tokyo), "Intercalation and Exfoliation of Graphite at Room Temperature", Mittal & Inagaki.
Tanso 1997, No. 180, pp. 239–244, "Preparation of Alkali Metal–Graphite Intercalation Compounds in Tetrahydrofuran Type of Solvents", Mizutani et al.
Carbon vol. 35, No. 8, pp. 1089–1096, 1997, "Electrochemical Synthesis and Characterization of Formic Acid–Graphite Intercalation Compound", Kang e t al.

Inorganic Materials, vol. 33, No. 6, 1997, pp. 584–587, "Synthesis of Interclation Compounds in the System Graphite $HNO_3$–$H_2SO_4$", Avdeev et al.
Inorganic Materials. vol. 33, No. 6, 1997, pp. 580–583, "Intercalation of Sulfuric Acid into Graphite in the Presence of Gaseous Oxidizers and Oleum", Avdeev et al.
Carbon vol. 35, No. 4, pp. 563–566, 1997, "A Novel Type of Reaction in the Chemistry of Graphite Intercalation Compounds. The Preparation of Alkali Metal Graphite Intercalation Compounds by Ion Exchange Reactions", Isaev et al.
Carbon vol. 35, No. 2, pp. 285–290, 1997, Formation of Iron Chloride–Graphite Intercalation Compounds in Propylene Carbonate by Electrolysis, Zhang et al.
Carbon vol. 35, No. 1, pp. 61–65, 1997, "Graphite Intercalation Compounds Prepared in Solutions of Alkali Metals in 2–Methyltetrahydrofuran and 2, 5–Dimethyltetrahydrofuran", Mizutani et al.
Carbon vol. 34, No. 12, Letter to the Editor, "Preparation of Lower–Sulfur Content and Expandable Graphite", Chen et al.
Journal Electrochem Society, vol. 143, No. 11, 1996, "Structure and Lithium Intercalation Properties of Synthetic and Natural Graphite", Shi et al.
The European Carbon Conference "Carbon 96"—Newcastle, UK, Jul. 1996, "Direct Thermooxidative Conversion of Graphite to Exfoliated Graphite. The Way to Novel Technologies", Savoskin et al.
Journal Phys. Chem. Solids, vol. 57, Nos. 6–8, pp. 925–930, 1996, "Ternary Graphite Intercalation Compounds of Type $M(NH_3)_xC_y$ With M = Be, Mg, Al, Sc, Y, La. Electrochemical Synthesis, Stability and NMR Studies", Stumpp et al.
Journal Phys. Chem Solids, Vol. 57, Nos. 6–8, pp. 883–888, 1996, "Electrochemical Synthesis of Sulfate Graphite Intercalation Compounds with Different Electrolyte Concentrations", Kang et al.
Journal Phys. Chem Solids, vol. 57, Nos. 6–8, pp. 783–786, 1996, Debye–Waller Factors of ICI–Graphite Intercalation Compounds Prepared From Natural Graphite Flakes and Graphitized Polymide Films, Abe et al.
Carbon '94, Jul. 3–8, 1994, Granada, Spain, Extended Abstracts and Programme, The University of Granada, "Synthesis of $FeCl_3$–GIC Using Electrochemical Method in an Aqueous Solution", Kang et al.
Carbon, vol. 31, No. 8, 1993, Printed in Great Britain, Letters to the Editor, "Room Temperature Exfoliation of Graphite Under Microgravity".

(List continued on next page.)

Primary Examiner—Shrive P. Beck
Assistant Examiner—Jennifer Kolb Midener

(57) ABSTRACT

Intercalated graphite flake which has enhanced exfoliation volume characteristics at relatively low exfoliation temperatures, e.g., 600° C. and even lower, is made by adding an organic expansion aid to the intercalant solution and heating a blend of intercalated particles and an organic reducing agent in the temperature range of 25° to 125° C.

29 Claims, No Drawings

OTHER PUBLICATIONS

X Sympozjum Przemyslu Elektrodowego, Extended Abstracts, "Preparation of Flexible Graphite from Czech Natural Graphite" Tomanova et al.

Carbon, vol. 31, No. 7, pp. 1131–1137, 1993, "Intercalation of Perfluorobutanesulfonic Acid in Graphite", Ruisinger et al.

Carbon, vol. 31, No. 5, pp. 777–781, 1993, "Intercalation of $AlCl_3$, Into $FeCl_3$–Graphite Intercalation Compounds and Occurrence of Bi–Intercalation", Inagaki et al.

Carbon, vol. 31, No. 1, pp. 201–204, 1993, "Laser–Assisted Exfoliation of Potassium–Ammonia–Graphite Intercalation Compounds", Kuga et al.

American Carbon Society, Twentieth Biennial Conference on Carbon, Jun. 23–28, 1991, Extended Abstracts and Program, "Electrochemical Preparation of Metal–Ammonia Graphite Intercalation Compounds in Liquid Ammonia", Stumpp et al.

American Carbon Society, Twentieth Biennial Conference on Carbon, Jun. 23–28, 1991, Extended Abstracts and Program, "Preparation of New Graphite Intercalation Compounds in Anhydrous Hydrogen Fluoride", Selig et al.

Carbon, vol. 30, No. 2, pp. 207–212, 1992, "Intercalation Process in the Ternary System of $FeCl_3$–$NiCl_2$–KCL", Ohira et al.

Carbon, vol. 29, No. 8, pp. 1227–1231, 1991, "Exfoliated Graphite From Various Intercalation Compounds", Yoshida et al.

Carbon, vol. 29, Nos. 4/5, pp. 595–597, 1991, "Upon the Intercalation of Rhenium Heptoxide and Rhenium Trioxide Nitrate into Graphite", Scharff et al.

International Carbon Conference, Paris, 1990, "Study of Dissociation and Exfoliation of Graphite–Nitrate", Petitjean et al.

Carbon, vol. 28, No. 1, pp. 119–123, 1990, "Electrochemical Preparation Of The Graphite Bi–Intercalation Compound With $H_2SO_4$ And $FeCl_3$", Shioyama et al.

Synthetic Metals, 34, 1989, 145–150, "The Formation of Graphite Intercalation Compounds From Trichloroacetic Acid and Trichloroaetic Acid Chloride Solutions Containing Molybdenum Compounds", Schulz et al.

Synthetic Metals, 34, 1989, 139–144, Potential Survey of Intercalation of Sulfuric Acid Into Graphite by Chemical Oxidation, Iwashita et al.

Synthetic Metals, 34, 1989, 73–78, Preparation of Metal Halide Graphite Intercalation Compounds by Intercalate Exchange, Stump et al.

Synthetic Metals, 26, 1988, 41–47, Electrochemical Synthesis of Graphite Intercalation Compounds with Nickel and Hydroxides, Inagaki et al.

Synthetic Metals, 25, 1988, 181–187, "Formation of Metal Chloride–Graphite Intercalation Compounds in Molten Salts", Wang et al.

Synthetic Metals, 20, 1987, 9–13, The Synthesis of $NiCl_2$–$FeCl_3$–Graphite Intercalation Compounds, Inagaki et al.

Synthetic Metals, 20, 1987, 1–8, Synthesis of Cupric Chloride–Graphite Intercalation Compounds by the Molten Salt Method, Inagaki et al.

Carbon '86, Proceedings, Jun. 30–Jul. 4, 1986, "Studies on the Exfoliation Mechanism of Intercalated Graphite Flakes", Mathur et al.

Tanso, No. 123, 1985, pp. 160–165, "Preparation of Exfoliated Graphite from Alkaline Metal–Graphite–Tetrahydrofurane Ternary Compounds", Inagaki et al.

Carbon, vol. 23, No. 5, p. 595, 1995, "Intercalation of Graphite with Antimony Tetrachloride Fluoride".

Tanso, No. 121, 1985, pp. 65–69, "Synthesis of Strontium–Graphite Intercalation Compounds", Akuzawa et al.

American Carbon Society and Unversity of Kentucky, Jun. 16–21, 1985, Extended Abstracts and Program, "Reaction of Chloroacids with Graphite", Stumpp et al.

Journal of Applied Electrochemistry 13, 1983, pp. 147–155, "The Electrochemical Formulation of Graphite–Bisulphate Intercalation Compounds", Berlouis et al.

Carbon, vol. 21, No. 3, pp. 181–188, 1983, "Intercalation by $(So_3F)_2$ in Various Forms of Graphite and Boron Nitride", Hooley.

American Carbon Society, Jul. 18–22, 1983, Extended Abstracts and Program, "Structure and Intercalation of Natural Flake Graphite", Murdie et al.

Journal of Materials Science 20, 1985, 171–181, "Intercalation of Natural Flake Graphites", Murdie et al.

* cited by examiner

EXPANDABLE GRAPHITE AND METHOD

RELATED APPLICATION

This application is a continuation-in-part of commonly-owned U.S. patent application Ser. No. 09/666,096, filed Sep. 21, 2000, now abandoned, entitled "Expandable Graphite and Method", which in turn is a continuation-in-part of commonly-owned U.S. patent application Ser. No. 09/633,184, filed Aug. 4, 2000, now abandoned, which in turn is a continuation-in-part of commonly-owned U.S. patent application Ser. No. 09/015,590, filed Jan. 29, 1998, now U.S. Pat. No. 6,149,972.

FIELD OF THE INVENTION

This invention relates to intercalated graphite flake having increased exfoliation volume at temperatures as low as 600° C. and even lower.

BACKGROUND OF THE INVENTION

Graphite is a crystalline form of carbon comprising atoms bonded in flat layered planes with weaker bonds between the planes. By treating particles of graphite, such as natural graphite flake, with an intercalant of, e.g., a solution of sulfuric and nitric acid, the crystal structure of the graphite reacts to form a compound of graphite and the intercalant. The treated particles of graphite are hereafter referred to as intercalated graphite flake. Upon exposure to elevated temperatures the particles of intercalated graphite expand in dimension in an accordion-like fashion in the c-direction, i.e. in the direction perpendicular to the crystalline planes of the graphite.

Intercalated graphite flake has many useful applications. A common application is to exfoliate the intercalated graphite particles into vermicular-like structures which are then compressed into sheets of flexible graphite for use in the manufacture of gaskets or as packing material. Intercalated graphite flake is also used in a variety of products which take advantage of the high expansion characteristic of intercalated graphite flake when exposed to high temperature. One such example is for use in combination with polymer foams to form seat cushions and furniture upholstery in aircraft. Upon exposure to fire, the high temperature will cause the particles of intercalated graphite to exfoliate which minimizes or prevents the formation of toxic gases from the polymer foam and may, of itself, smother a fire.

Since it is important to suppress, i.e. retard a fire before it has begun to spread, it would be a substantial advantage for an intercalated graphite flake product to exhibit a very high degree of exfoliation upon exposure to temperatures as low as 600° C. and even lower.

It has been discovered in accordance with the present invention that the addition of an organic expansion aid to the intercalation solution and the treatment of intercalated graphite flake with an organic reducing agent, following intercalation of the graphite flake with an oxidizing intercalant solution, and while the graphite flake is covered with a coating of oxidizing intercalant solution, results in a material which exhibits enhanced exfoliation volumes at exfoliation temperatures as low as 600° C. and even lower.

SUMMARY OF THE INVENTION

The method of the present invention for forming particles of intercalated graphite flake having enhanced exfoliation volume at temperatures as low as 600° C. and even lower by:

(a) adding an organic expansion aid to an oxidizing intercalant solution;

(b) treating particles of graphite with the oxidizing intercalant solution containing the expansion aid to provide intercalated graphite flake with a surface film of oxidizing intercalant solution;

(c) contacting the surface film of the intercalated graphite flake with an organic reducing agent in the form of an organic compound selected from sugars, alcohols, aldehydes and esters which is reactive with the film of oxidizing intercalant solution at temperatures in the range of 25° C. to 125° C.; and (d) subjecting the thus treated intercalated graphite flake to a temperature in the range of 25° C. to 125° C. to promote a reaction of the organic reducing agent with the surface film of oxidizing solution.

DETAILED DESCRIPTION OF THE INVENTION

Intercalated graphite flake is conventionally formed, by treating particles of natural graphite with agents that intercalate into the crystal structure of the graphite to form a compound of graphite and the intercalant capable of expansion in the c-direction, i.e. the direction perpendicular to the crystalline planes of the graphite, when heated to a high temperature of above 700° C. and preferably above 1000° C. The intercalated graphite flake is washed and dried prior to exfoliation. Exfoliated graphite particles are vermiform in appearance and are commonly referred to as "worms".

A common conventional method for forming intercalated graphite flake (and for manufacturing sheets of flexible graphite from exfoliated graphite) is described in U.S. Pat. No. 3,404,061 the disclosure of which is incorporated herein by reference. As disclosed in the above mentioned patent natural graphite flake is intercalated by dispersing flakes in a solution containing an oxidizing agent, such as a mixture of nitric and sulfuric acid. After the flakes are intercalated excess solution is drained from the flakes. The quantity of intercalation solution retained on the flakes after draining is typically greater than 100 parts of solution by weight per 100 parts by weight of graphite flakes (pph) and more typically about 100 to 150 pph.

The intercalant of the present invention contains oxidizing intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In the preferred embodiment of the invention, the intercalant is a solution of sulfuric acid, or sulfuric acid and phosphoric acid, and an oxidizing agent, i.e. nitric acid, perchloric acid, chromic acid, potassium permanganate, iodic or periodic acids, or the like, and preferably also includes an expansion aid as described below. Although less preferred, the intercalant may contain metal halides such as ferric chloride, and ferric chloride mixed with sulfuric acid, or a halogen, such as bromine as a solution of bromine and sulfuric acid or bromine in an organic solvent.

In accordance with the present invention the particles of graphite flake treated with intercalant are contacted e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include the following: hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, propylene glycol monooleate, glycerol monostearate, glycerol monooleate, dimethyl oxylate, diethyl oxylate, methyl formate, ethyl formate and ascorbic acid.

Also effective are polyfunctional compounds, e.g., those having both surfactant qualities and more than one reducing function selected from the group consisting of alcohols, esters, aldehydes and the like. One example is lignin-derived compounds, such as sodium lignosulfate. The preferred compounds are preferably liquid at application temperature and essentially free of water. Among the suitable polyfunctional compounds in this group are surfactants derived from ethylene oxide and/or propylene oxide and a compound capable of contributing a hydrophobic group to the compound, e.g., polymers of ethylene oxide and nonylphenol available as Tergitol NP detergents, products formed by the reaction of linear secondary alcohols with ethylene oxide available as Tergitol 15-S- detergents, and various alkylaryl polyether alcohols prepared by the reaction of octylphenol with ethylene oxide as are available as Triton X detergents. Examples are presented below of materials effective as reducing organic agents that can improve both free and compressed expansion.

The amount of organic reducing agent is suitably from about 0.5 to 4% by weight of the the particles of graphite flake. The use of an expansion aid applied prior to intercalation or during intercalation can also provide improvement. Among these improvements can be reduced exfoliation temperature, and increased expanded volume (also referred to as "worm volume").

An expansion aid in this context will be an organic material sufficiently soluble in the intercalant solution to achieve an improvement in expansion. More narrowly, organic materials of this type that contain carbon, hydrogen and oxygen, preferably exclusively, may be employed. Carboxylic acids have been found effective in this invention. A suitable carboxylic acid as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 10 carbon atoms, which is soluble in the aqueous intercalant solution employed according to the invention in amounts effective to provide a measurable improvement of one or more aspects of exfoliation. Preferred products are characterized by an intumescent temperature of below about 200° C. According to some observations, exfoliation can be initiated at temperatures as low as 160°. Suitable water-miscible organic solvents can be employed to improve solubility of an organic expansion aid in the intercalant solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant.

Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10 -decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalant solution will be aqueous and will preferably contain an amount of expansion aid of from about 1 to 10%, the amount being effective to enhance exfoliation. In the embodiment wherein the expansion aid is contacted with the graphite flake prior to immersing in the aqueous intercalant solution, the expansion aid can be admixed with the graphite by suitable means, such as a V-blender, typically in an amount of from about 0.2% to about 10% by weight of the graphite flake. After intercalating the graphite flake with an intercalating solution, preferably containing an expansion aid, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

EXAMPLE 1

Twenty-five grams of a (+50 mesh) natural graphite flake were intercalated with twenty-five grams of intercalant consisting of 86 parts by weight of 93% sulfuric acid and 14 parts by weight of 67% nitric acid. After mixing for three minutes, 1.0 grams of decanol were blended into the flakes. The flakes were then placed in a 90° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 222 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully financing them into a 250 ml graduated cylinder. The expansion volume was 566 cc/g.

Comparative Example 1 (A)

Twenty-five grams of a (+50 mesh) natural graphite flake were intercalated for 20 minutes with 25 grams of intercalant consisting of 86 parts by weight of 93% sulfuric acid and 14 parts by weight of 67% nitric acid. No reducing agent and no external heat and digestion period were applied to the intercalated flakes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 32 cc,/g. The expansion was inferior to that obtained in example (1) since neither a reducing agent nor ,a high temperature digestion period was employed.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 110 cc/g. The expansion was inferior to that obtained in example (1) since neither a reducing agent nor a high temperature digestion period were employed.

Comparative Example 1 (B)

Twenty-five grams of a (+50 mesh) natural graphite flake were intercalated for 3 minutes with 25 grams of intercalant consisting of 86 parts, by weight of 93% sulfuric acid and 14 parts by weight of 67% nitric acid. No reducing agent was applied to the intercalated flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 26 cc/g. The expansion was inferior to that obtained in example (1) since no reducing agent was employed with the process.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 147 cc/g. The expansion was inferior to that obtained in example (1) since no reducing agent was employed with the process.

EXAMPLE 2

Twenty-five grams of a (+50 mesh) natural graphite flake were intercalated with 25 grains of intercalant consisting of 86 parts by weight of 98% sulfuric acid and 14 parts by weight of 67% nitric acid. After mixing for three minutes, 2 grams of hexadecanol were blended into the flakes. The flakes were then placed in a 90° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 178 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 531 cc/g.

Comparative Example 2

Twenty-five grams of a (+50 mesh) natural graphite flake were intercalated for 20 minutes with 25 grams of intercalant consisting of 86 parts by weight of 98% sulfuric acid and 14 parts by weight of 67% nitric acid. No reducing agent and no external heat were applied to the intercalated flakes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 30 cc/g. The expansion was inferior to that obtained in example (2) since no reducing agent and no external heat were applied to the intercalated flakes.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 142 cc/g. The expansion was inferior to that obtained in example (2) since no reducing agent and no external heat were applied to the intercalated flakes.

EXAMPLE 3

Twenty-five grams of a (+50 mesh) natural graphite flake were intercalated with 25 grams of intercalant consisting of 90 parts by weight of 93% sulfuric acid and 10 parts by weight of 67% nitric acid. After mixing for three minutes, 0.75 grams of 1-octanol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 203 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 634 cc/g.

Comparative for Examples 3 to 8

Twenty -five grams of a (+50 mesh) natural graphite flake were intercalated for 20 minutes with 25 grams of intercalant consisting of 90 parts by weight of 93% sulfuric acid and 10 parts by weight of 67% nitric acid. No reducing agent and no external heat were applied to the intercalated flakes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 29 cc/g. The expansion was inferior to that obtained in examples (3 to 8) since no reducing agent and no external heat were applied to the intercalated flakes.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 188 cc/g. The expansion was inferior to that obtained in examples (3 to 8) since no reducing agent and no external heat were applied to the intercalated flakes.

EXAMPLE 4

Twenty-five grams of a (+50 mesh) natural graphite flake were intercalated with 25 grams of intercalant consisting of 90 parts by weight of 93% sulfuric acid and 10 parts by weight of 67% nitric acid. After mixing for three minutes, 0.50 grams of 1-propanol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 94 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 439 cc/g.

EXAMPLE 5

Twenty -five grams of a (+50 mesh) natural graphite flake were intercalated with 25 grams of intercalant consisting of 90 parts by weight of 93% sulfuric acid and 10 parts by weight of 67% nitric acid. After mixing for three minutes, 0.375 grams of 1,3-propanediol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 83 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 381 cc/g.

EXAMPLE 6

Twenty-five grams of a (+50 mesh) natural graphite flake were intercalated with 25 grains of intercalant consisting of 90 parts by weight of 93% sulfuric acid and 10 parts by weight of 67% nitric acid. After mixing for three minutes, 0.500 grams of 1, 10 decanediol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was116 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 511 cc/g.

EXAMPLE 7

Twenty-five grams of a (+50 mesh) natural graphite flake were intercalated with 25 grams of intercalant consisting of 90 parts by weight of 930% sulfuric acid and 10 parts by weight of 67% nitric acid. After mixing for three minutes, 1.00 grams of decylaldehyde were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 156 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 521 cc/g.

EXAMPLE 8

Twenty-five grams of a (+50 mesh) natural graphite flake were intercalated with 25 grams of intercalant consisting of 90 parts by weight of 93% sulfuric acid and 10 parts by weight of 67% nitric acid. After mixing for three minutes, 1.0 grain of the ester, ethylene glycol monostearate, was blended into the flakes. The flakes were then stirred on a hot plate for 10 minutes temperature increasing to 90° C. to dissolve the ethylene glycol monostearate). The mixture was then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 124 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 379 cc/g.

EXAMPLE 9

Twenty-five grams of a (+50 mesh) natural graphite flake were intercalated with 25 grams of intercalant consisting of 90 parts by weight of 93% sulfuric acid and 10 parts by weight of 67% nitric acid. After mixing for three minutes, 0.375 grams of sucrose were blended into the flakes. The flakes were then stirred on a hot plate for 10 minutes (temperature increasing to 90° C. to dissolve the sucrose). The mixture was then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 73 cc/g.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was 342 cc/g.

Comparative for Example 9

Twenty-five grams of a (+50 mesh) natural graphite flake were intercalated with 25 grams of intercalant consisting of 90 parts by weight of 93 % sulfuric acid and 10 parts by weight of 67% nitric acid. After mixing for three minutes, 0.375 grams of sucrose were blended into the flakes. The flakes were then stirred and blended at room temperature (20°) for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was only 31 cc/g. The expansion was inferior to that obtained for Example (9) since the sample was blended with sucrose at 20° C. for only 20 minutes.

The expansion or exfoliation volume of the intercalated flakes was also measured by heating the intercalated graphite flakes in a 845° C. preheated metal crucible over a Bunsen burner flame, and measuring the bulk volume of the resulting exfoliated flakes. The volume and weight of the expanded flakes were measured after carefully funneling them into a 250 ml graduated cylinder. The expansion volume was only 156 cc/g. The expansion was inferior to that obtained in example (9) since no external heat was applied to the intercalated flakes.

EXAMPLE 10

Twenty-five grams of a (+50 mesh) natural graphite flake were intercalated with 25 grams of intercalant consisting of 90 parts by weight of 93% sulfuric acid, 10 parts by weight of 67% nitric acid, and 3.5 pph of oxalic acid. After mixing for three minutes, 0.25 grams of polypropylene glycol were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 260 cc/g.

EXAMPLE 11

Twenty-five grams of a (+50 mesh) natural graphite flake were intercalated with 25 grams of intercalant consisting of 90 parts by weight of 93% sulfuric acid, 10 parts by weight of 67% nitric acid, and 3.5 pph of oxalic acid. After mixing for three minutes, 0.625 grams of ascorbic acid were blended into the flakes. The flakes were then placed in a 100° C. oven for 20 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 270 cc/g.

EXAMPLE 12

Twenty-five grams of a (+50 mesh) natural graphite flake were intercalated with 25 grams of intercalant consisting of 90 parts by weight of 93% sulfuric acid, 10 parts by weight of 67% nitric acid, and 3.5 pph of oxalic acid. After mixing for three minutes, 0.50 grams of sodium lignate were blended into the flakes. The flakes were then placed in a 100° C. oven for 30 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 290 cc/g.

EXAMPLE 13

Twenty-five grams of a (+50 mesh) natural graphite flake were intercalated with 25 grams of intercalant consisting of 90 parts by weight of 93% sulfuric acid, 10 parts by weight of 67% nitric acid, and 4.0 pph of succinic acid. After mixing for three minutes, 1.00 grams of decanol were blended into the flakes. The flakes were then placed in a 100° C. oven for 30 minutes. The intercalated flakes were then washed with four aliquots of 200 ml of water. After each washing the flakes were filtered by vacuum through a Teflon screen. After the final wash the flakes were dried for 1 hour in a 115° C. oven.

The expansion of the intercalated flakes was measured by placing exactly 1.00 g into a 250 ml crucible. The cold crucible was placed into a 600° C. oven for 2 minutes. The volume and weight of the expanded flakes were measured after carefully funneling them into a 250 ml graduated cylinder. The expansion volume was 355 cc/g.

EXAMPLE 14

A series of polyfunctional reducing agents was evaluated for their effect on both cold crucible expansion and compressed expansion. For each run, graphite flake was intercalated as in Example 12 and then subjected to expansion testing as in that example to obtain a value for cold crucible expansion. A value for compressed expansion was obtained by varying the above test by using a special test device that employs a 400 gram weight to rest upon 5 grams of the graphite flake placed in a 2.54 cm diameter cylinder and exert a pressure on the flake during heating and expansion. The results are summarized in the following table:

| Reagent | Grams Reagent | Cold Crucible Expansion at 600° C., cc/g | Compressed Expansion height at 600° C., mm |
|---|---|---|---|
| Triton X-100[1] | 0.225 | 298 | 72.8 |
| Tergitol NP-10[2] | 0.225 | 293 | 76.5 |
| Tergitol 15-S-7[3] | 0.225 | 339 | 73.4 |
| Polypropylene Glycol[4] | 0.25 | 260 | 60 |

[1]Product of Union Carbide Company. The Triton "X-" products are generally described as alkylaryl polyether alcohols, prepared by the reaction of octylphenol with ethylene oxide. The products are mixtures with respect to length of the polyoxyethylene chain; the subscript "x" values represent the average number of ethylene oxide units.
[2]Product of Union Carbide Company, identified as a polymer of ethylene oxide and nonylphenol, with a hydroxyl number of 86 and a molecular weight of 652.
[3]Product of Union Carbide Company, identified as a polyethylene glycol ether of a secondary alcohol.
[4]Molecular weight 1200.

In each of the above cases, the polyfunctional surfactant reducing additive increases both cold crucible and compressed expansion compared to a nonsurfactant polyfunctional reducing additive, polypropylene glycol.

What is claimed is:

1. Method for providing intercalated graphite flake with increased exfoliation volume at exfoliation temperatures of 600° C. or lower, which comprises: (i) adding carboxylic acid organic expansion aid to an oxidizing intercalant solution; (ii) treating of graphite flake with the oxidizing intercalant solution containing the organic expansion aid to provide intercalated graphite flake having a surface film of oxidizing intercalant solution; (iii) blending said intercalated graphite flake, which has a surface coating film of the oxidizing intercalant solution with an organic reducing agent reactive with the oxidizing intercalant solution, at temperatures of from 25° C. to 110° C., the reducing agent being an organic compound selected from sugars, alcohols, aldehydes and esters in an amount of from 0.5 to 4% by weight of the graphite flake; and (iv) heating the blend of step (iii) to a temperature in the range of 25° C. to 125° C. to promote reaction of the organic reducing agent with the coating of oxidizing intercalant solution.

2. Method in accordance with claim 1 wherein a temperature in the range of 25° C. to 125° C. is maintained for at least about 10 minutes.

3. Method in accordance with claim 1 wherein said oxidizing intercalant solution is a mixture of nitric acid and sulfuric acid.

4. Method in accordance with claim 1 wherein said organic reducing agent is decanol.

5. Method in accordance with claim 1 wherein said organic reducing agent is hexadecanol.

6. Method in accordance with claim 1 wherein said organic reducing agent is 1-octanol.

7. Method in accordance with claim 1 wherein said organic reducing agent is 1-propanol.

8. Method in accordance with claim 1 wherein said organic reducing agent is 1,3 propanediol.

9. Method in accordance with claim 1 wherein said organic reducing agent is 1,10 decanediol.

10. Method in accordance with claim 1 wherein said organic reducing agent is decylaldehyde.

11. Method in accordance with claim 1 wherein said organic reducing agent is ethylene glycol.

12. Method in accordance with claim 1 wherein said organic reducing agent is monostearate.

13. Method in accordance with claim 1 wherein said organic reducing agent is sucrose.

14. Method in accordance with claim 1 wherein said organic reducing agent is ascorbic acid.

15. Method in accordance with claim 1 wherein said organic reducing agent is a lignate.

16. Method in accordance with claim 1 wherein said organic reducing agent is polypropylene glycol.

17. Method in accordance with claim 1 wherein said organic reducing agent is a polyfunctional surfactant, liquid reagent.

18. The method of claim 1, wherein:

said carboxylic acid expansion aid is selected from the group consisting of oxalic acid, formic acid, and succinic acid.

19. The method of claim 1, wherein:

said carboxylic acid expansion aid is selected from the group consisting of oxalic acid and succinic acid.

20. The method of claim 1, wherein:

said carboxylic acid expansion aid is selected from the group consisting of aromatic, aliphatic, cycloaliphatic, straight chain, branched chain, saturated monocarboxylic, unsaturated monocarboxylic, saturated dicarboxylic, unsaturated dicarboxylic, and polycarboxylic carboxylic acids.

21. The method of claim 1, wherein:

said carboxylic acid expansion aid has from 1 to 10 carbon atoms.

22. The method of claim 1, wherein:

said carboxylic acid expansion aid has an intumescent temperature of below about 200° C.

23. The method of claim 1, wherein:

said carboxylic acid expansion aid is of the formula:

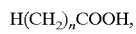

wherein n is a number from 0 to 5.

24. The method of claim 1, wherein:

said carboxylic acid expansion aid is selected from the group consisting of formic acid, acetic acid, propionic acid, butyric acid, pentanoic acid, and hexanoic acid.

25. The method of claim 1, wherein:

said carboxylic acid expansion aid is a dicarboxylic acid.

26. The method of claim 25, wherein:

said dicarboxylic acid expansion aid is an aliphatic dicarboxylic acid having 2–12 carbon atoms.

27. The method of claim 25, wherein:

said dicarboxylic acid expansion aid is selected from the group consisting of oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, and cyclohexane-1,4-dicarboxylic acid.

28. The method of claim 1, wherein:

said dicarboxylic acid expansion aid is an aromatic carboxylic acid.

29. The method of claim 28, wherein:

said aromatic carboxylic acid is selected from the group consisting of phthalic acid and terephthalic acid.

* * * * *

UNITED STATES PATENT AND TRADEMARK OFFICE
CERTIFICATE OF CORRECTION

PATENT NO. : 6,416,815 B2  Page 1 of 1
DATED : July 9, 2002
INVENTOR(S) : Greinke et al.

It is certified that error appears in the above-identified patent and that said Letters Patent is hereby corrected as shown below:

Title page,
Item [75], Inventors, "Robert Anderson Reyolds, III" should read as -- Robert Anderson Reynolds III --
Assistant Examiner "Jennifer Kolb Midener" should read as -- Jennifer Kolb Michener --.

Column 2,
Line 18, "...conventionally formed. by" should read as -- ...conventionally formed by --

Column 5,
Line 2, "...after carefully financing" should read as -- ...after carefully funneling --
Line 23, "...agent nor ,a high..." should read as -- ...agent nor a high... --

Signed and Sealed this

Fourteenth Day of January, 2003

JAMES E. ROGAN
*Director of the United States Patent and Trademark Office*